(12) United States Patent
Tapucu et al.

(10) Patent No.: US 7,924,947 B2
(45) Date of Patent: Apr. 12, 2011

(54) METHOD AND APPARATUS FOR DECODING SATELLITE NAVIGATION DATA FROM A SATELLITE POSITIONING SYSTEM

(75) Inventors: Emre Tapucu, Los Gatos, CA (US);
Charles Abraham, Los Gatos, CA (US);
Frank van Diggelen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1043 days.

(21) Appl. No.: 11/009,593

(22) Filed: Dec. 10, 2004

(65) Prior Publication Data
US 2006/0126762 A1 Jun. 15, 2006

Related U.S. Application Data

(63) Continuation-in-part of application No. 10/774,309, filed on Feb. 6, 2004, now Pat. No. 7,447,253.

(51) Int. Cl.
*H04L 27/06* (2006.01)
(52) U.S. Cl. ........ 375/340; 375/136; 375/150; 375/344; 375/350
(58) Field of Classification Search .................. 375/340
See application file for complete search history.

(56) References Cited

U.S. PATENT DOCUMENTS

| | | | |
|---|---|---|---|
| 6,611,756 B1 * | 8/2003 | Chen et al. ............... 701/213 |
| 6,686,853 B2 * | 2/2004 | Shen et al. .................. 341/50 |
| 6,775,802 B2 * | 8/2004 | Gaal .......................... 714/758 |
| 6,816,710 B2 * | 11/2004 | Krasner ...................... 455/73 |
| 2005/0130590 A1 * | 6/2005 | Pande et al. .............. 455/12.1 |

* cited by examiner

*Primary Examiner* — Shuwang Liu
*Assistant Examiner* — Dhaval Patel
(74) *Attorney, Agent, or Firm* — McAndrews, Held & Malloy, Ltd.

(57) ABSTRACT

Method and apparatus for decoding a bitstream of navigation data broadcast by a satellite positioning system satellite is described. In one example, a portion of a subframe in the navigation data for each of a plurality of occurrences of the subframe in the bitstream is obtained at a satellite signal receiver to produce a respective plurality of subframe portions. The subframe portions are then combined to recover the subframe. The subframe portions may be processed to maintain a constant polarity by comparing a common sequence of data bits among at least two of the subframe portions to identify a mismatch in polarity.

14 Claims, 8 Drawing Sheets

METHOD AND APPARATUS FOR DECODING SATELLITE NAVIGATION DATA FROM A SATELLITE POSITIONING SYSTEM

This application claims priority to and is a continuation-in-part of "METHOD AND APPARATUS FOR PROCESSING SATELLITE POSITIONING SYSTEM SIGNALS TO OBTAIN TIME INFORMATION", U.S. patent application Ser. No. 10/774,309 by Tapucu, et. al., filed Feb. 6, 2004, now U.S. Pat. No. 7,447,253 issued on Nov. 4, 2008.

BACKGROUND OF THE INVENTION

1. Field of the Invention

Embodiments of the present invention generally relate to satellite position location systems and, more particularly, to a method and apparatus for decoding satellite navigation data from a satellite positioning system.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

Notably, FIG. 1 illustrates the format of a GPS navigation message 102, as defined by ICD-GPS-200C. The navigation message 102 spans 12.5 minutes and comprises 25 frames. Each of the frames, such as frame 104, spans 30 seconds and comprises five subframes. In turn, each of the five subframes, such as subframe 106, spans six seconds and comprises ten words. Finally, each of the ten words, such as word 108, spans 0.6 seconds and comprises 30 bits.

The first three subframes of a frame, such as the frame 104, include satellite orbit information and clock correction information associated with a particular broadcasting satellite. The first three subframes of a frame are collectively referred to as "ephemeris". Over a particular period of time (e.g., four hours), the first three subframes are identically repeated in each frame. The fourth and fifth subframes in a frame include part of a satellite almanac, which includes coarse ephemeris and time model information for the entire satellite constellation. The contents of the fourth and fifth subframes change until the entire almanac is transmitted. The repetition period of the fourth and fifth subframes in a frame is 12.5 minutes (i.e., the entire satellite almanac is contained in 15,000 bits).

Some of the transmitted data sequence of a navigation message is not common to the source information (e.g., ephemeris, time-of-day, etc.) represented by the message. Rather, the transmitted data sequence represents a coded version of the source data. Typically, a Hamming-type code is utilized that allows error deduction (e.g., parity checking). To this end, each of the transmitted 30-bit words of the navigation message comprises 24 data bits and 6 parity bits. This allows errors of three bits or less to be detected.

The conventional technique for decoding navigation messages is by decoding complete subframes of data. That is, for each subframe, the receiver attempts to decode the subframe as a block (300 bits) until the subframe is decoded. For example, if the receiver is only successful in decoding 100 bits of a subframe, the receiver will discard the decoded bits and attempt to decode the subframe again until the entire 300-bit subframe is decoded in a single block. In some GPS applications, the signal strengths of the satellite signals are so low that either the signals cannot be processed, or the time required to process the signals is excessive. Notably, the receiver may be unable to decode an entire subframe as a block in signal fading conditions. Absent another source of satellite navigation data, the receiver will not be able to locate its position.

Accordingly, there exists a need in the art for improved decoding of satellite navigation data from a satellite positioning system in the presence of low signal strengths.

SUMMARY OF THE INVENTION

Method and apparatus for decoding a bitstream of navigation data broadcast by a satellite positioning system satellite is described. In one embodiment, a portion of a subframe in the navigation data for each of a plurality of occurrences of the subframe in the bitstream is obtained at a satellite signal receiver to produce a respective plurality of subframe portions. The subframe portions are then combined to recover the subframe. The subframe portions may be processed to maintain a constant polarity by comparing a common sequence of data bits among at least two of the subframe portions to identify a mismatch in polarity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for decoding navigation data from a satellite positioning system. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals, such as Global Positioning System (GPS) signals.

According to an aspect of the invention, a method and apparatus is provided for improving the acquisition of satellite navigation data at an SPS receiver. Such improved satellite navigation data acquisition is provided in accordance with a word-by-word navigation data decoding process. In one embodiment, individual data words obtained from the navigation message carried by each SPS signal that pass parity are retained, while data words that fail parity are discarded. The individual data words are stored in a buffer and are grouped according to the subframe to which they belong. In this manner, at least a portion of each subframe (i.e., one or more data words) may be obtained for each occurrence of such subframe in the navigation message. In randomly varying signal fading conditions, it is likely that some or all of the data words of a subframe that previously failed parity will pass parity after one or more decoding attempts. Thus, after a plurality of occurrences of each subframe in the navigation message, the subframe portions stored in the buffer may be combined to recover the complete subframe.

Figure 1:
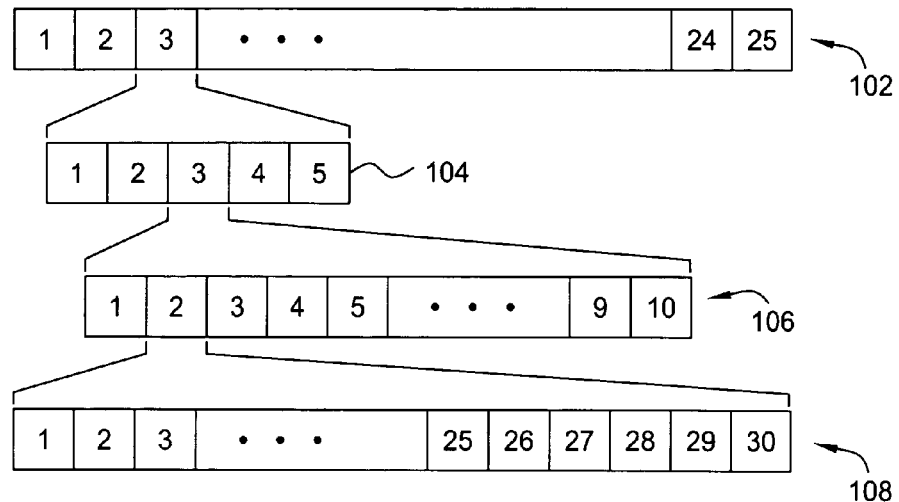
FIG. 1 depicts a diagram showing the format of a GPS navigation message.
Figure 2:
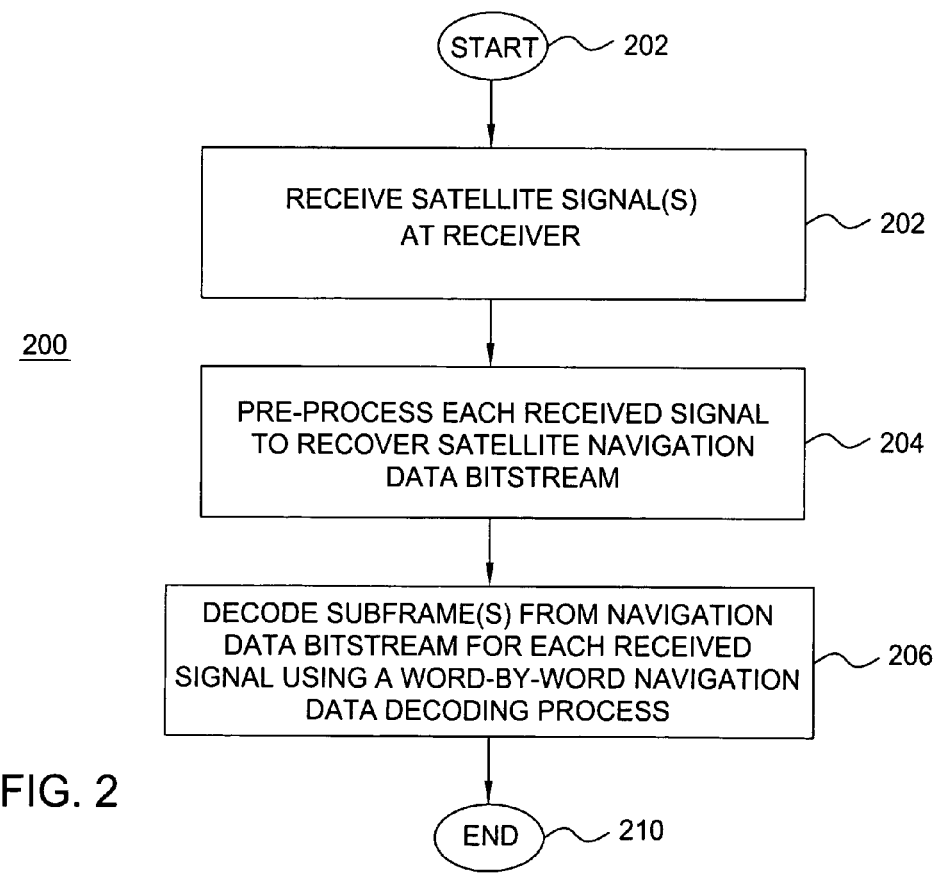
FIG. 2 is a block diagram depicting an exemplary embodiment of a method for acquiring satellite navigation data in accordance with the invention.

FIG. 2 is a flow diagram depicting an exemplary embodiment of a method 200 for acquiring satellite navigation data in accordance with the invention. The method 200 may be employed by a satellite signal receiver to acquire satellite navigation data, for example, when signal-to-noise ratio (SNR) is relatively low. The method 200 begins at step 202. At step 204, one or more SPS signals are received at a satellite signal receiver. Exemplary embodiments of a satellite signal receiver that may be used are described below with respect to FIGS. 8 and 9. Each of the one or more SPS signals received contains at least a portion of an SPS satellite's transmitted navigation message. One embodiment of a navigation message format for GPS is shown in FIG. 1.

At step 206, each received SPS signal is pre-processed to recover a navigation data bitstream. In one embodiment, pre-processing involves removal of the pseudorandom noise (PN) from the received signal(s) using a well-known correlation process (i.e., "dispreading" the received signal(s)) to obtain a narrowband data signal (i.e., 50 baud data sequence). The narrowband signal for each of the received signals is then demodulated to recover a data bitstream in a well known manner. For example, the narrowband signal(s) may be demodulated using such techniques as differential demodulation, coherent summation, decision directed demodulation, and like type demodulation techniques known in the art. In another embodiment, pre-processing involves correlating the received signal(s) with pseudorandom reference codes to produce a set of correlation samples over time (a "correlation history"). The correlation history for each received signal is processed to obtain a sequence of navigation data bits. The term "bitstream" is meant to encompass both an actual stream of bits produced by demodulating a narrowband signal in real time and a sequence of bits produced by analyzing a correlation history. Additional details regarding pre-processing are described below with respect to the receivers of FIGS. 8 and 9.

At step 208, one or more subframes are decoded from the navigation data bitstream for each received signal using a word-by-word navigation data decoding process. Exemplary embodiments of a word-by-word navigation data decoding process are described below with respect to FIGS. 3-5. The method 200 ends at step 210.

Figure 3:
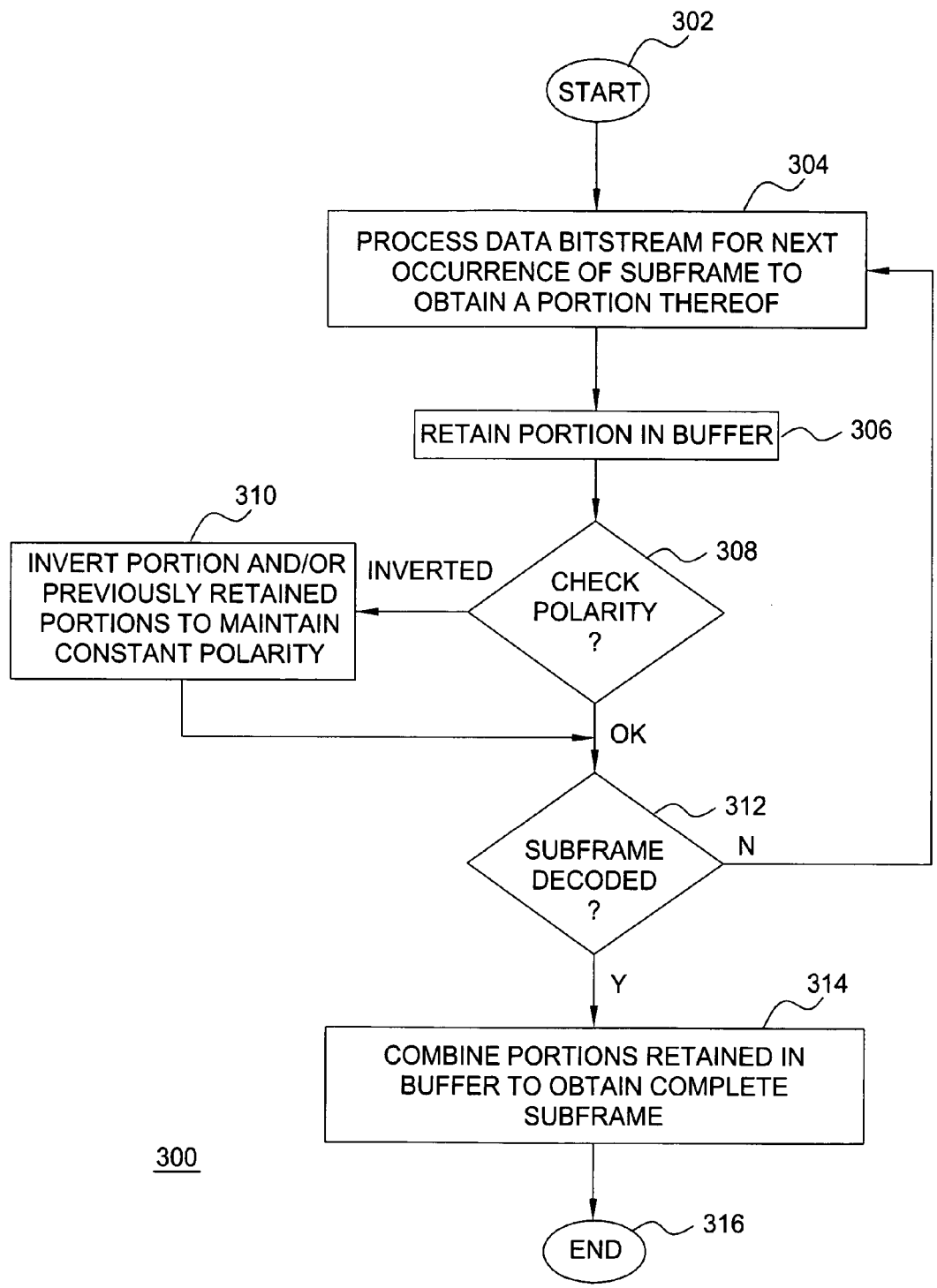
FIG. 3 is a flow diagram depicting an exemplary embodiment of a method for processing a navigation data bitstream to obtain a subframe in accordance with the invention.

FIG. 3 is a flow diagram depicting an exemplary embodiment of a method 300 for processing a navigation data bitstream to obtain a subframe in accordance with the invention. The method 300 may be performed to obtain one or more subframes from the navigation data bitstream of each received signal as part of step 208 in the method 200 of FIG. 2. The method 300 begins at step 302. At step 304, the navigation data bitstream is processed for the next occurrence of the subframe to obtain a portion thereof. The obtained subframe portion comprises one or more words of the subframe. Each word may comprise a data word in the set of data words comprising the subframe. Alternatively, each word may comprise a data word, as well as one or more additional bits from a neighboring word or neighboring words (referred to herein as an "extended word"). As such, the term "word" as used herein is meant to encompass both a data word and an extended word. At step 306, the subframe portion is retained in a buffer.

At step 308, the polarity of the subframe portion is checked against the polarity of one or more previously retained subframe portions in the buffer. Notably, since the buffer may contain subframe portions obtained from different occurrences of the subframe in the bitstream, the polarity of some subframe portions may be inverted with respect to the polarity of other subframe portions. A mismatch in polarity may be identified using a common sequence of data bits between the subframe portion retained at step 306 (currently retained subframe portion) and one or more previously retained subframe portions stored in the buffer. For example, the currently retained subframe portion may include one or more words that have already been retained in the buffer as part of a previously retained subframe portion. If the current version of a word is inverted with respect to a previous version of the same word, then each word in the currently retained subframe portion should be inverted to maintain a constant polarity of words in the buffer. Once the first word of the subframe has been retained, the preamble therein may be used to check the polarity of the subframe.

If the currently retained subframe portion is deemed inverted, then the method 300 proceeds to step 310. At step 310, the currently retained subframe portion and/or at least one previously retained subframe portion is inverted to maintain a constant polarity. If the currently retained subframe portion is not deemed to be inverted, then the method 300 proceeds to step 312. At step 312, a determination is made as to whether the subframe has been decoded. That is, a determination is made as to whether the buffer includes each word in the set of words comprising the subframe. If not, the method 300 returns to step 304. If so, the method 300 proceeds to step 314. At step 314, the subframe portions retained in the buffer are combined to obtain the complete subframe. The method 300 ends at step 316.

Figure 4:
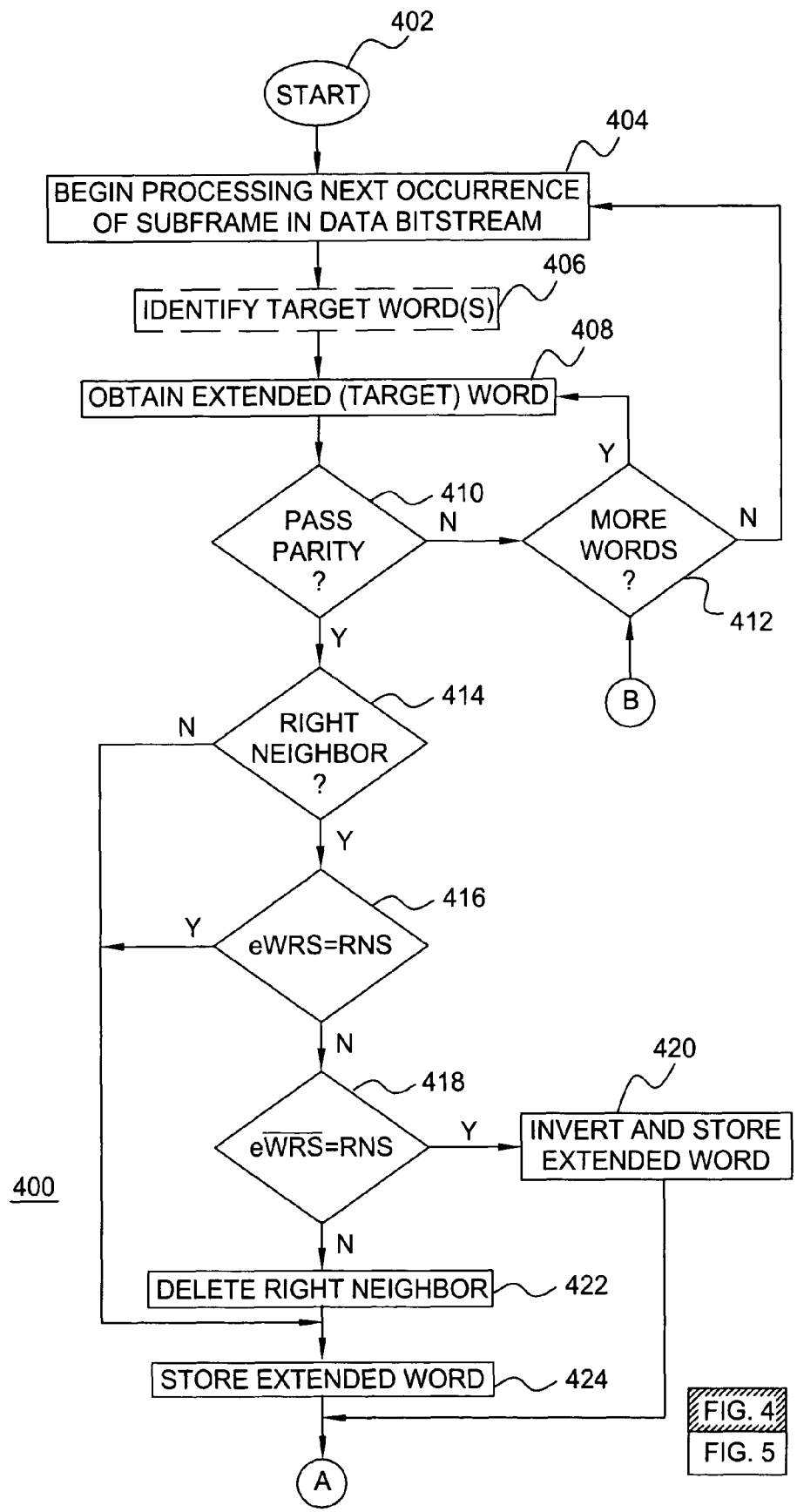
FIGS. 4 and 5 depict a flow diagram of another exemplary embodiment of a method for processing a navigation data bitstream to obtain a subframe in accordance with the invention.
Figure 5:
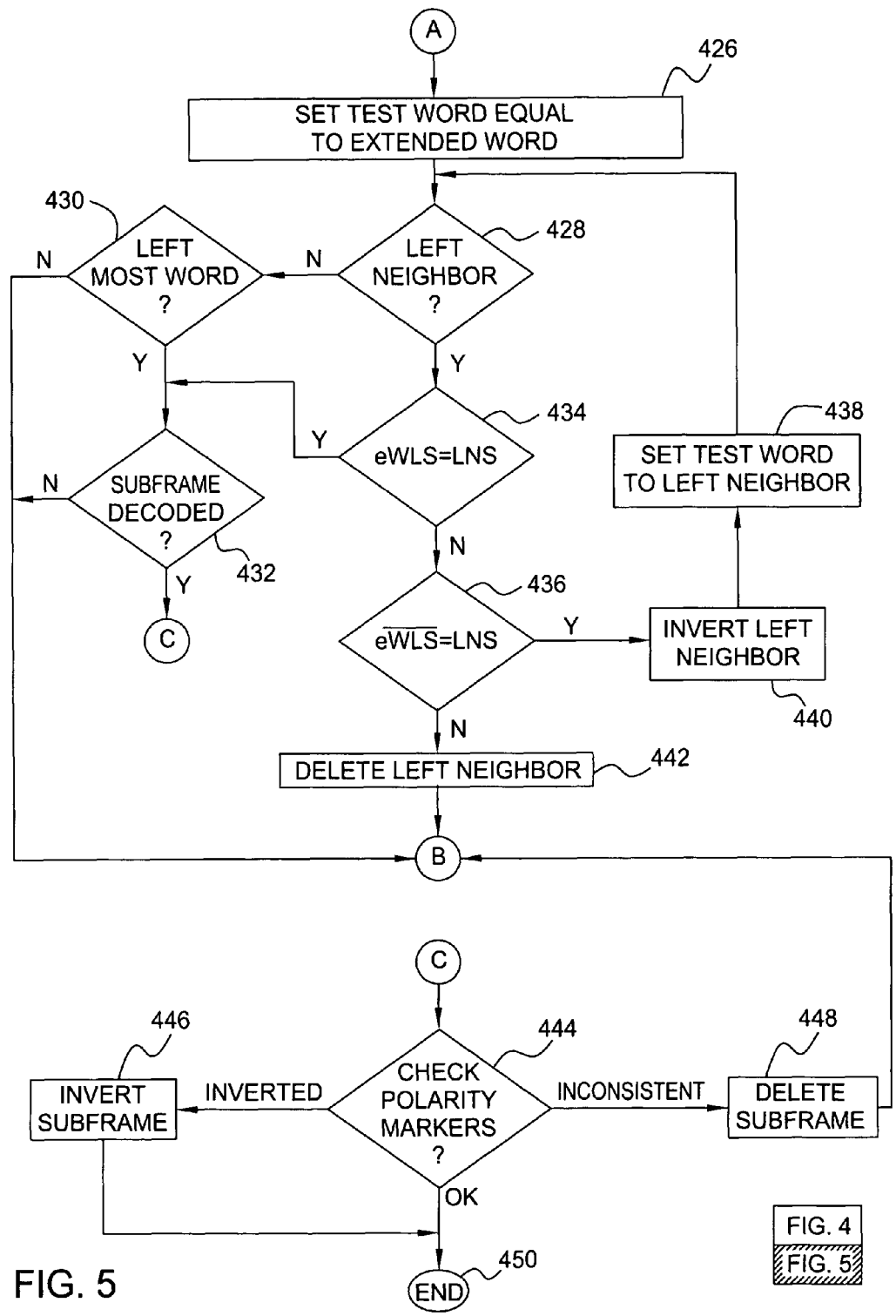

FIGS. 4 and 5 depict a flow diagram of another exemplary embodiment of a method 400 for processing a navigation data bitstream to obtain a subframe in accordance with the invention. The method 400 may be performed to obtain one or more subframes from the navigation data bitstream of each received signal as part of step 208 in the method 200 of FIG. 2. The method 400 begins at step 402. At step 402, processing is begun on the next occurrence of the subframe in the data bitstream. From step 402, the method 400 proceeds to step 408, where an extended word is obtained. An "extended word" comprises a data word of the subframe (e.g., a 30-bit word in GPS), as well as one or more bits from a neighboring word (referred to as "stitch bits"). As described below, the stitch bits are used to check the polarity of the extended word such that a constant polarity is maintained among extended words stored in the buffer.

Figure 6:
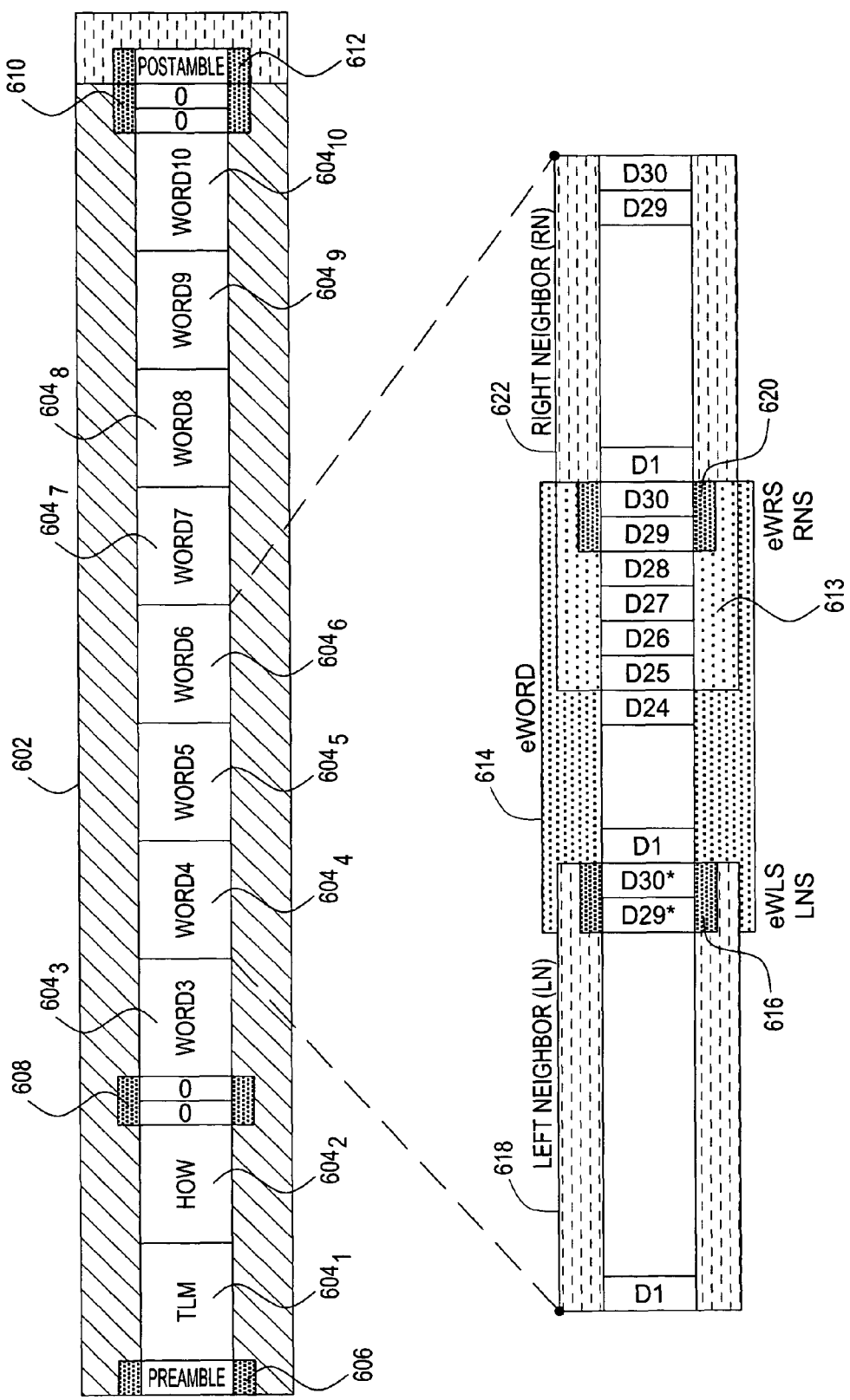
FIG. 6 illustrates the structure of a GPS subframe and an extended word in accordance with the invention.

Notably, FIG. 6 illustrates the structure of a GPS subframe and an extended word in accordance with the invention. In the GPS navigation message, a subframe 602 includes data words $604_1$ through $604_{10}$ (collectively referred to as data words 604). The first data word $604_1$ is known as the telemetry word (TLM word) and includes a preamble 606. The preamble 606 includes a known eight-bit sequence defined as "10001011". The second data word $604_2$ is known as the handover word (HOW). The last pair of bits (bit pair 608) in the HOW $604_2$ is always '00'. Likewise, the last pair of bits (bit pair 610) in the data word $604_{10}$ is always '00'. The preamble 606, the bit pair 608, and the bit pair 610 in combination with a postamble 612 (i.e., the preamble of the next subframe in the data stream) comprise polarity verification markers for the subframe 602.

In the present example, an extended word 614 comprising the data word $604_5$ is shown in detail. The extended word 614 comprises 30 data bits D1 through D30 of the data word $604_5$, as well as a pair of data bits D29 and D30 (bit pair 616) from a left neighbor 618 of the data word $604_5$ (i.e., the data word $604_4$). The last six bits D24 through D30 of the extended word 614 comprise parity bits 613 for the data word $604_5$. The pair of data bits D29 and D30 of the data word $604_5$ (bit pair 620) comprise the first two bits of a next successive extended data word comprising a right neighbor 622 of the data word $604_5$ (i.e., the data word $604_6$). The bits in the bit pair 616 are referred to as "left stitch bits," and the bits in the bit pair 620 are referred to as "right stitch bits." From the viewpoint of the extended word 614, the left stitch bits are referred to as "eWLS," and the right stitch bits are referred to as "eWRS." From the viewpoint of the left neighbor 618, the left stitch bits are referred to as "LNS". From the viewpoint of the right neighbor 622, the right stitch bits are referred to as "RNS." In this manner, extended words may be obtained for each of the data words 604 in the subframe. Note that the extended word comprising the data word $604_1$ does not include left stitch bits, and that the extended word comprising the data word $604_{10}$ does not include right stitch bits.

Returning to FIGS. 4 and 5, at step 410, a determination is made as to whether the extended word obtained at step 408 passes parity. That is, parity is checked for the data word in the extended word. If the extended word fails parity, the method 400 proceeds to step 412. At step 412, a determination is made as to whether there are more extended words to obtain in the current occurrence of the subframe in the data bitstream. If so, the method 400 returns to step 408. Otherwise, the method 400 returns to step 404.

If, at step 410, the extended word passes parity, the method 400 proceeds to step 414. At step 414, a determination is made as to whether there is a right neighbor stored in the buffer for the extended word. If not, the method 400 proceeds to step 424, where the extended word is stored in the buffer. If there is a right neighbor for the extended word, the method 400 proceeds from step 414 to step 416. At step 416, a determination is made as to whether the right stitch bits of the extended word (eWRS) match the corresponding stitch bits of the right neighbor (RNS). If so, the method 400 proceeds to step 424. Notably, if eWRS matches RNS, then the extended word does not need to be inverted, since the polarity matches. Otherwise, the method 400 proceeds to step 418.

At step 418, a determination is made as to whether the right stitch bits of the extended word (eWRS) are inverted with respect to the corresponding stitch bits of the right neighbor (RNS). If so, the method 400 proceeds to step 420, where the extended word is inverted and stored in the buffer. The method 400 proceeds from step 420 to step 426. If the right stitch bits of the extended word (eWRS) are not inverted with respect to the corresponding stitch bits of the right neighbor (RNS), then the method 400 proceeds from step 418 to step 422, where the right neighbor is deleted from the buffer. If the eWRS does not match RNS, and if eWRS is not inverted with respect to RNS, then there is an inconsistency between the extended word and the right neighbor. As such, the right neighbor is deleted. The method 400 proceeds from step 422 to step 424.

At step 426, a test word is set equal to the extended word obtained at step 408. At step 428, a determination is made as to whether there is a left neighbor stored in the buffer for the test word. If not, the method 400 proceeds to step 430. At step 430, a determination is made as to whether the test word is the left most word in the subframe (e.g., the TLM word in GPS). If not, the method 400 returns to step 412. If the test word is the left most word in the subframe, the method 400 proceeds from step 430 to step 432. At step 432, a determination is made as to whether the subframe has been decoded. That is, a determination is made as to whether each word in the set of words comprising the subframe is retained in the buffer. If so, the method 400 proceeds to step 444 (discussed below). Otherwise, the method 400 returns to step 412.

If, at step 428, there is a left neighbor stored in the buffer for the test word, the method 400 proceeds to step 434. At step 434, a determination is made as to whether the left stitch bits of the extended word (eWLS) match the corresponding stitch bits in the left neighbor to the test word (LNS). If so, the method 400 proceeds to step 432. Notably, if eWRS matches LNS, then the extended word does not need to be inverted, since the polarity matches. Otherwise, the method 400 proceeds to step 436. At step 436, a determination is made as to whether the left stitch bits of the extended word (eWLS) are inverted with respect to the corresponding stitch bits in the left neighbor to the test word (LNS). If not, the method 400 proceeds to step 442, where the left neighbor is deleted from the buffer. The method 400 returns to step 412 from step 442. If the left stitch bits of the extended word (eWLS) are inverted with respect to the corresponding stitch bits in the left neighbor to the test word (LNS), the method 400 proceeds from step 436 to step 440. At step 440, the left neighbor of the test word is inverted. The method 400 proceeds from step 440 to step 438, where the test word is set equal to the left neighbor. The method 400 returns to step 428 from step 438.

At step 444, polarity verification markers in the subframe are checked. If the polarity verification markers are inconsistent, the method 400 proceeds to step 448, where the subframe is deleted. The method 400 then returns to step 412 from step 448. If the polarity verification markers indicate that the entire subframe is inverted, then the method 400 proceeds to step 446, where the subframe is inverted. The method 400 then ends at step 450. If the polarity verification markers indicate that the subframe is of proper polarity, then the method 400 ends at step 450.

In one embodiment, at step 408, the extended word is obtained from the current occurrence of the subframe in the data bitstream irrespective of the extended words already retained in the buffer. In another embodiment, a targeted decoding process may be employed. Notably, after processing has begun for the next occurrence of the subframe in the data bitstream at step 404, the method 400 proceeds to optional step 406. At step 406, the extended words retained in the buffer are analyzed to identify target words that have not been obtained. At step 408, only an extended target word is obtained. Extended words that have already been retained in the buffer are skipped.

Figure 7:
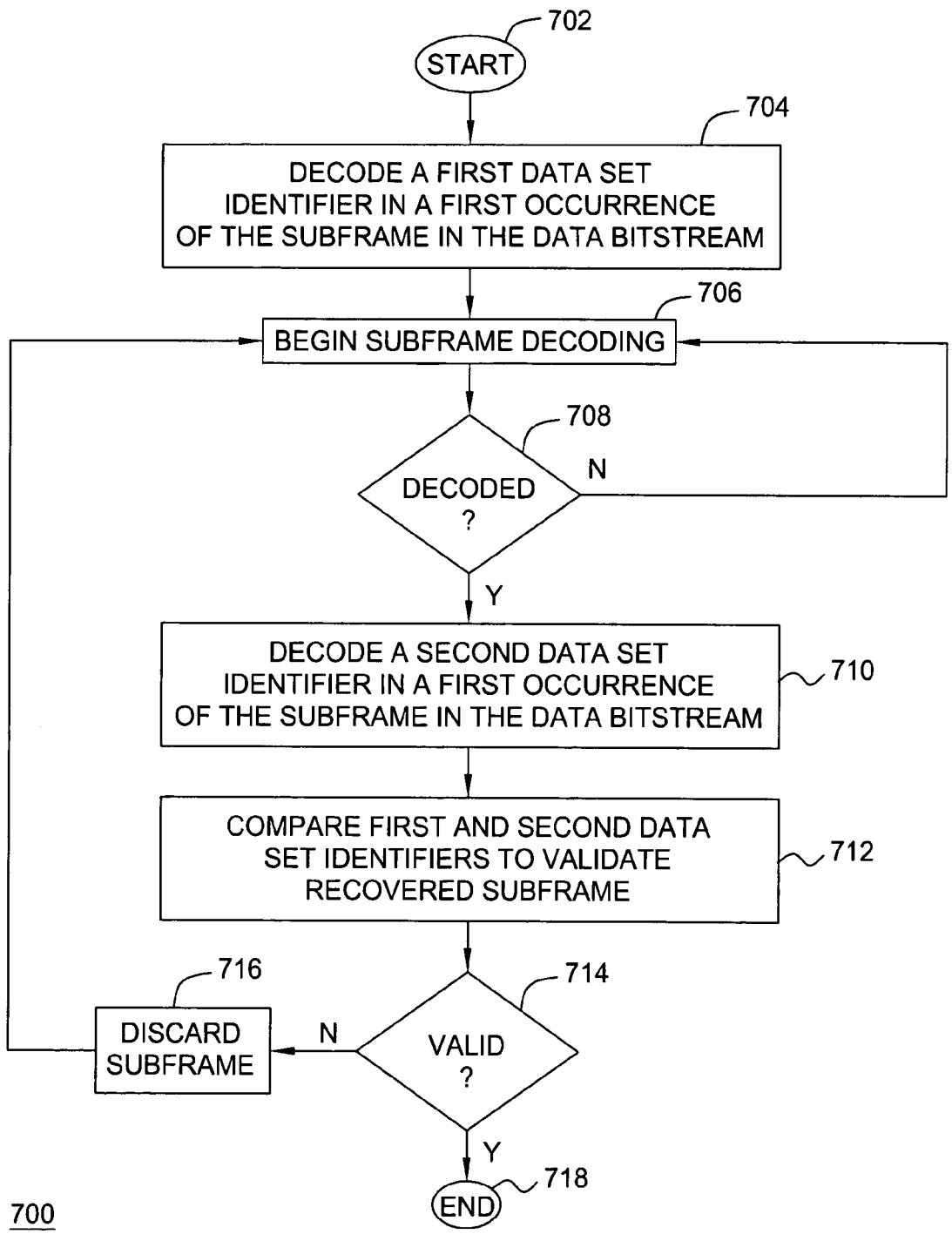
FIG. 7 is a flow diagram depicting an exemplary embodiment of a method for verifying a subframe decoded using a word-by-word navigation decoding process of the invention.

FIG. 7 is a flow diagram depicting an exemplary embodiment of a method 700 for verifying a subframe decoded using a word-by-word navigation decoding process of the invention. The method 700 begins at step 702. At step 704, a first data set identifier in a first occurrence of the subframe in the data bitstream is decoded. Notably, in the GPS navigation message, subframes 1 through 3 generally change every two hours, but may also change unpredictably without notice. Subframes 1 through 3 should be taken from a common data set, particularly subframes 2 and 3, since these subframes hold the satellite orbit model. If part of one data set were mixed with a different data set (either on a word basis or a subframe basis), the resulting data could be invalid, possibly leading to errors in a position computed by the satellite signal receiver. In the GPS navigation message, word 8 of subframe 1, word 3 of subframe 2, and word 10 of subframe 3 each contain a parameter known as IODE/IODC. As described in the ICD 20.3.4.4, the IODC is a 10 bit identifier of the data set, where the IODE is the eight least significant bits (LSBs) of the IODC.

At step 706, a word-by-word subframe decoding process is started. For example, either of the methods 300 or 400 may be initiated. At step 708, a determination is made as to whether the word-by-word subframe decoding process has produced a subframe. If not, the method 700 returns to step 706. Otherwise, the method 700 proceeds to step 710. At step 710, a second data set identifier in a next occurrence of the subframe in the data bitstream is decoded. At step 712, the first and second data set identifiers are compared to validate the recovered subframe. At step 714, a determination is made as to whether the subframe is valid. If the first and second data set identifiers match, the subframe is valid and the method 700 ends at step 718. If the first and second data set identifiers do not match, the subframe is invalid and the method 700 returns to step 706.

Figure 8:
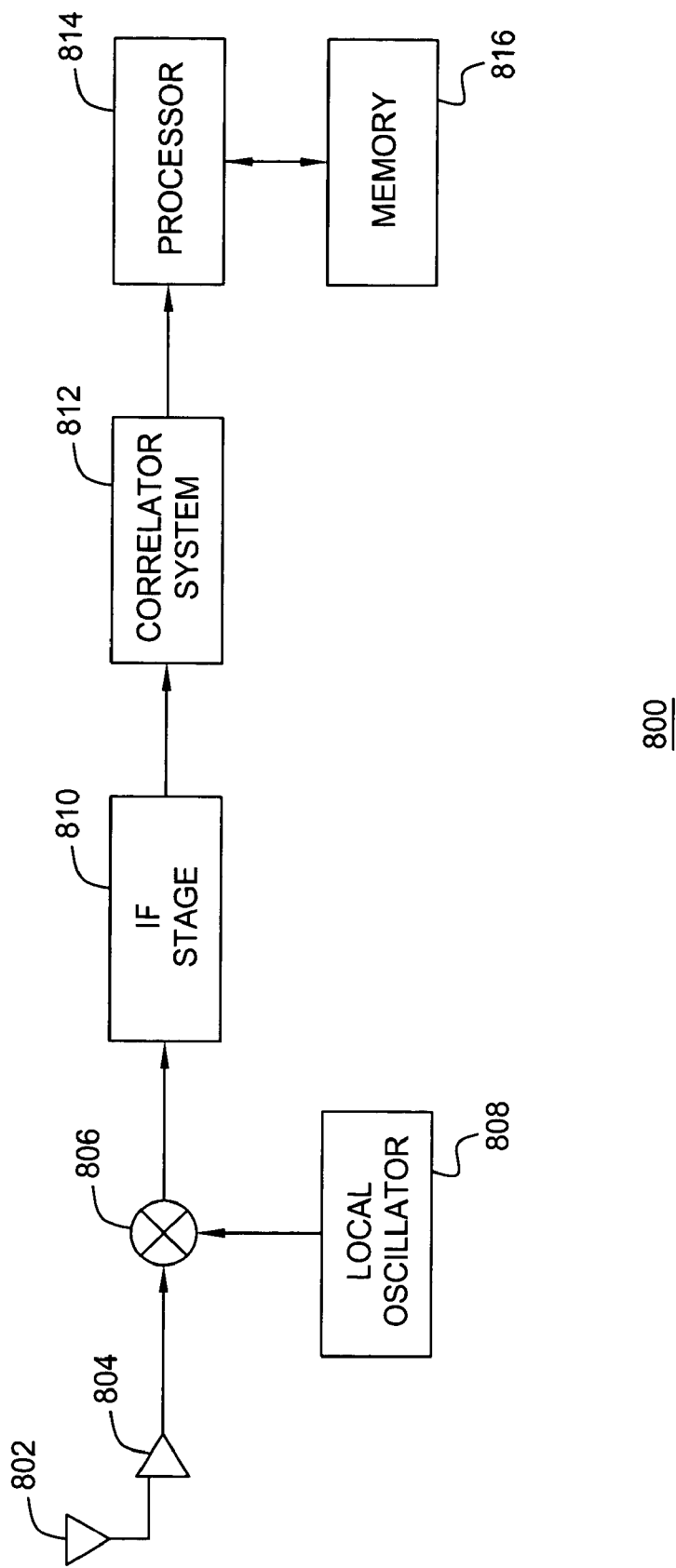
FIG. 8 is a block diagram depicting an exemplary embodiment of a satellite signal receiver in which the present invention may be used.

FIG. 8 is a block diagram depicting an exemplary embodiment of a satellite signal receiver 800 in which the present invention may be used. The satellite signal receiver 800 illustratively comprises an antenna 802, an amplifier 804, a mixer 806, a local oscillator 808, an intermediate frequency (IF) stage 810, a correlator system 812, a processor 814, and a memory 816. SPS signals are provided from the antenna 802 to the amplifier 804. The amplifier 804 amplifies the SPS signals and provides amplified SPS signals to the mixer 806. The mixer 806 mixes the amplified SPS signals with a local oscillator (LO) signal from the local oscillator 808. The mixer 806 produces down-converted SPS signals, which are provided to the IF stage 810. The IF stage 810 frequency translates the down-converted SPS signals to near-baseband or baseband SPS signals and provides such frequency translated SPS signals to the correlator system 812.

The correlator system 812 is coupled to the processor 814, which may control operation of the correlator system 812, as well as the local oscillator 808, such that SPS signals are acquired and tracked. Notably, the correlator system 812 removes the pseudorandom noise (PN) from the received SPS signals using a well-known correlation process (i.e., the correlator system 812 "despreads" the received SPS signals) to obtain a relatively narrowband data signal. The narrowband data signal is demodulated by the processor 814 for each received SPS signal in a well-known manner. For example, the narrowband signal may be demodulated using such techniques as differential demodulation, coherent summation, decision directed demodulation, and like type demodulation techniques known in the art.

Figure 9:
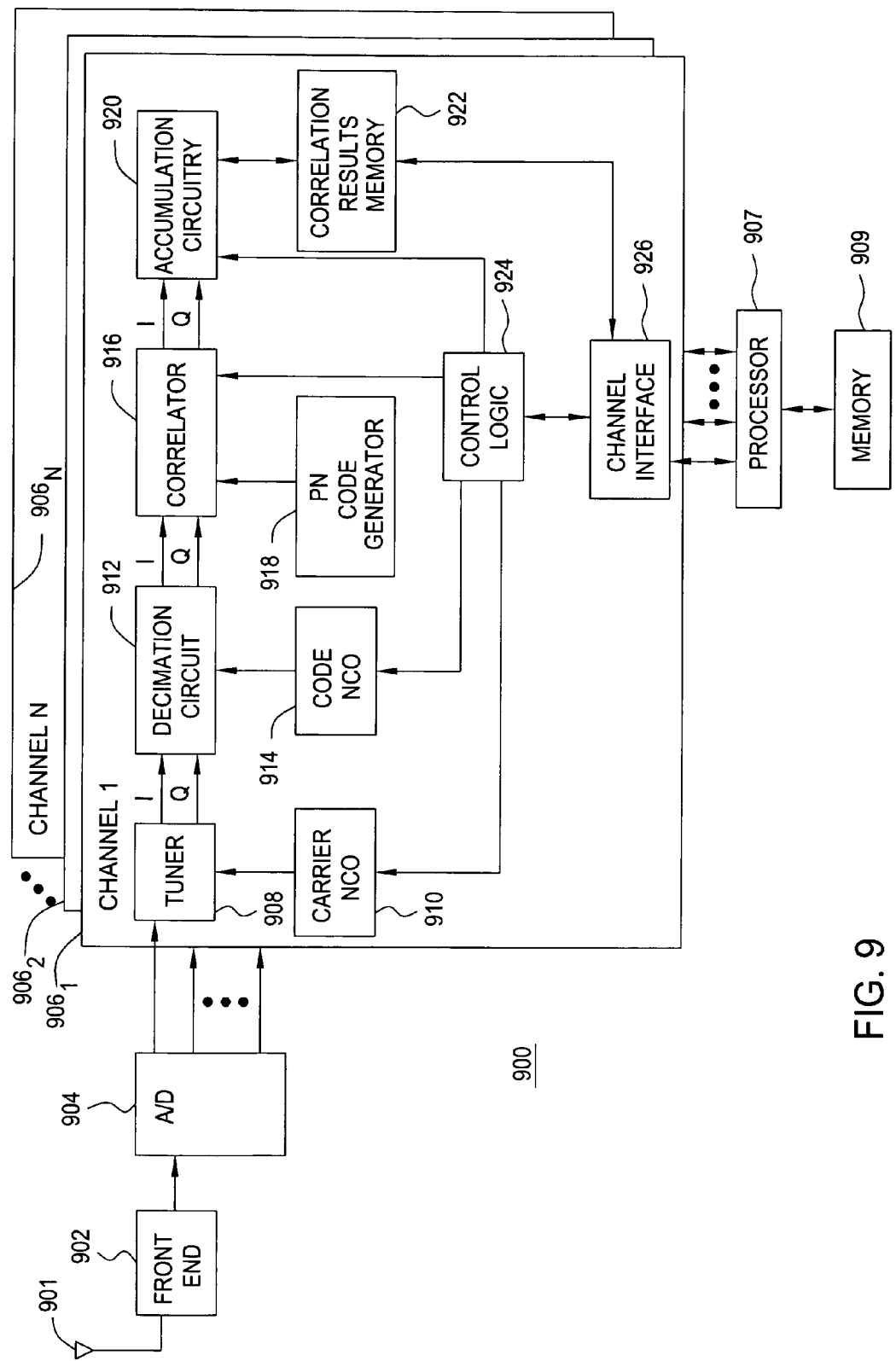
FIG. 9 is a block diagram depicting another exemplary embodiment of a satellite signal receiver in which the present invention may be used.

FIG. 9 is a block diagram depicting another exemplary embodiment of a satellite signal receiver 900 in which the present invention may be used. The satellite signal receiver 900 comprises a front end 902, an analog-to-digital converter 904, a processor 907, a memory 909, and a set of processing channels 906$_1$ through 906$_N$ (collectively referred to as processing channels 906), where N is an integer. For purposes of clarity by example, only the processing channel 906$_1$ is shown in detail. Those skilled in the art will appreciate that the processing channels 906$_2$ through 906$_N$ are identical to the processing channel 906$_1$.

SPS signals are received by an antenna 901. The front end 902 filters, amplifies, and frequency shifts the GPS signals in a well-known manner for digitization by the A/D converter 904. Outputs of the A/D converter 904 are respectively coupled to each of the processing channels 906. The processor 907 includes a bus configured to communicate with each of the processing channels 906.

Each of the processing channels 906 comprises a tuner 908, a carrier numerically controlled oscillator (NCO) 910, a decimation circuit 912, a code NCO 914, a correlator 916, a PN code generator 918, accumulation circuitry 920, correlation results memory 922, control logic 924, and channel interface logic 926. Each of the processing channels 906 may be used to process a signal from a particular satellite. The tuner 908 is driven by the carrier NCO 910 to digitally tune a particular satellite signal. The tuner 908 may server two purposes. First, the tuner 908 may remove any intermediate frequency component remaining after processing by the front end 902. Second, the tuner 908 may compensate for any frequency shift resulting from satellite motion, user motion, and reference frequency errors. The tuner 908 outputs baseband signal data comprises an in-phase component (I) and a quadrature component (Q).

The decimation circuit 912 processes the I and Q data from the tuner 908 to produce a series of complex signal samples with I and Q components in accordance with a sampling rate determined by the code NCO 914. In general, the sampling rate of the decimation circuit 912 may be selected to produce m samples per chip of the satellite signal PN code, where m is an integer greater than zero.

The correlator 916 processes the I and Q samples from the decimation circuit 912. The correlator 916 correlates the I and Q signals with an appropriate PN code generated by the PN code generator 918 for the particular satellite signal. The I and Q correlation results are accumulated with other I and Q correlation results by the accumulation circuitry 920 and are stored in the correlation results memory 922. The accumulation process is referred to as signal integration and is used to improve signal-to-noise ratio of the correlation results.

Notably, the accumulation circuitry 920 may accumulate I and Q correlation results over a time period associated with one or more epochs of the PN code. For example, the I and Q correlation results may be accumulated over a one millisecond interval (i.e., one PN code epoch) or over a multiple millisecond interval (e.g., 20 PN code epochs). This process is referred to as coherent integration and the associated time period is referred to as a coherent integration interval. In general, the correlation results memory 922 stores a sequence of I and Q correlation results captured over a selected time period (e.g., 1 to 10 seconds), where each result may have been integrated over a selected coherent integration interval (e.g., 1 to 10 ms). Since correlation results may be captured over many seconds, the results stored in the correlation results memory 922 may be referred to herein as a "correlation history."

The coherent integration interval is limited by several factors, including uncompensated Doppler shift, 180 degree phase transitions caused by the navigation data bits, and phase shifts induced by motion of the receiver 900. These factors introduce slow, but seemingly random phase variations into the signals. Over many tens of milliseconds, these phase changes cause destructive interference that defeats the purpose of coherent integration.

The carrier NCO 910, the code NCO 914, the correlator 916, and the accumulation circuitry 920 is controlled by the control logic 924. The control logic 924 may receive configuration data for the processing channel 906$_1$ from the channel interface 926. The channel interface 926 may receive the configuration data from the processor 907. In addition, the channel interface 926 provides an interface for the processing channel 906$_1$ to the correlation results memory 922. The sequence of correlation results stored within the correlation results memory 922 may be used to estimate the satellite navigation data bits that phase modulate the PN code of the received satellite signal. For a detailed understanding of the satellite signal receiver 900 and the components discussed above, as well as the process or estimating satellite navigation data bits from a correlation history, the reader is referred to commonly-assigned U.S. patent application Ser. No. 10/690, 973, filed Oct. 22, 2003, which is incorporated by reference herein in its entirety.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

The invention claimed is:

1. A method of decoding a navigation message broadcast by a satellite positioning system satellites, said method comprising:
   receiving a subframe at a circuit, wherein the sub-frame and a plurality of other sub-frames form a portion of a frame, and wherein the subframe comprises a plurality of data words;
   attempting validation of each of the plurality of data words;
   retaining a portion of the plurality of data words in the subframe that are validated;
   receiving a recurrence of the subframe;
   attempting validation of a portion of the words in the recurring subframe that correspond to a portion of words in the subframe that were not validated when the subframe was previously received;
   retaining ones of the portion of the words in the recurring subframe that are validated that correspond to the portion of the words in the subframe that were not validated when the subframe was previously received; and
   assembling the subframe with the portion of the plurality of data words that are validated from the subframe and the ones of the portion of the words in the recurring subframe that are validated that correspond to the portion of the words in the subframe that were not validated when the subframe was previously received.

2. The method of claim 1, further comprising: processing said plurality of subframe portions, wherein said plurality of subframes comprises portions of different subframe occurrences to maintain a constant polarity.

3. The method of claim 2, wherein said step of processing comprises: comparing a common sequence of data bits among at least two of said plurality of subframe portions to identify a mismatch in polarity.

4. The method of claim 1, further comprising: repeating said steps of obtaining and combining with respect to at least one additional subframe in said navigation message.

5. The method of claim 1, further comprising:
   decoding a first data set identifier from a bitstream during a first occurrence of said plurality of occurrences of said subframe;
   decoding a second data set identifier from said bitstream during a second occurrence of said plurality of occurrences of said subframe; and
   comparing said first data set identifier and said second data set identifier to validate a recovered subframe.

6. The method of claim 5, wherein said satellite positioning system satellite comprises a Global Positioning System (GPS) satellite, said navigation message comprises GPS navigation data, and each of said first data set identifier and said second data set identifier comprises an IODE parameter.

7. The method of claim 1, further comprising:
   analyzing polarity verification markers in a recovered subframe; and inverting said recovered subframe in response to a polarity verification markers being inverted.

8. The method of claim 1, further comprising processing with a processor said plurality of subframe portions to maintain a constant polarity.

9. The method of claim 8, wherein said processor is configured to, for each of said plurality of occurrences of said subframe in a bitstream:
decode at least one word from said bitstream; check parity for each said at least one word; and store each said at least one word that passes parity in said memory.

10. The method of claim 8, wherein said processor is configured to:
decode a first data set identifier from a bitstream during a first occurrence of said plurality of occurrences of said subframe;
decode a second data set identifier from said bitstream during a second occurrence of said plurality of occurrences of said subframe; and
compare said first data set identifier and said second data set identifier to validate said recovered subframe.

11. The method of claim 10, wherein said satellite positioning system satellite comprises a Global Positioning System (GPS) satellite, said navigation message comprises GPS navigation data, and each of said first data set identifier and said second data set identifier comprises an IODE parameter.

12. The method of claim 8, wherein said processor is configured to:
analyze polarity verification markers in a recovered subframe; and
invert said recovered subframe in response to said polarity verification markers being inverted.

13. The method of claim 8, wherein none of the at least one data word that fail priority are used to recover the sub-frame.

14. The method of claim 1, further comprising:
receiving a second recurrence of the subframe;
attempting validation of a portion of the words in the second recurring subframe that correspond to a portion of words in the subframe and the recurring frame that are not validated;
retaining ones of the portion of the words in the second recurring subframe that are validated; and
assembling the subframe with the portion of the plurality of data words that are validated from the subframe, the data words that are validated from the recurrance of the subframe and the second recurrence of the subframe.

* * * * *